W. B. BULL.
APPARATUS FOR MAKING ARTIFICIAL ICE.
APPLICATION FILED FEB. 25, 1909.
948,131.
Patented Feb. 1, 1910.
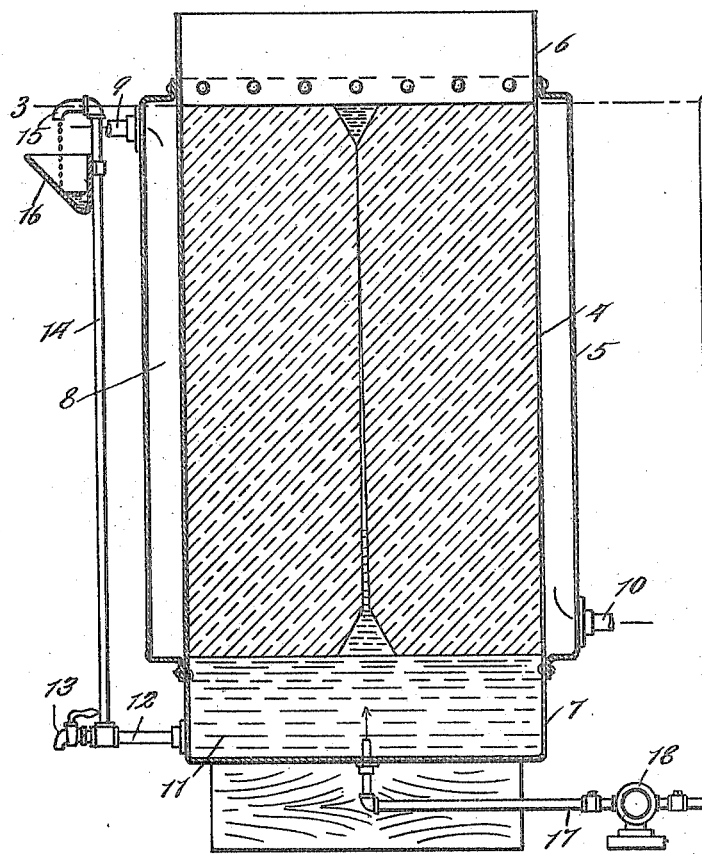
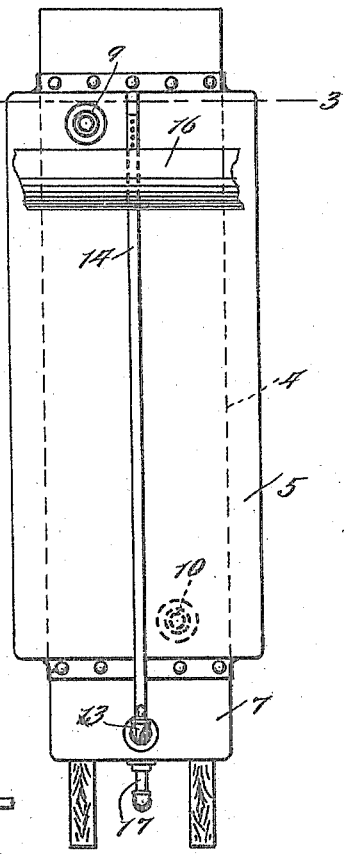
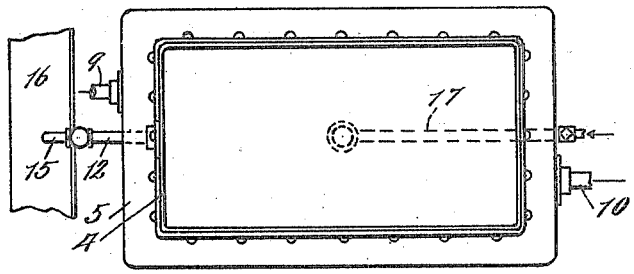
WITNESSES:
INVENTOR.
William B. Bull,
BY
his ATTORNEYS.

UNITED STATES PATENT OFFICE.

WILLIAM B. BULL, OF CHICAGO, ILLINOIS, ASSIGNOR TO POLAR ICE MACHINE COMPANY, OF CHICAGO, ILLINOIS, A CORPORATION OF ILLINOIS.

APPARATUS FOR MAKING ARTIFICIAL ICE.

948,131.  Specification of Letters Patent.  Patented Feb. 1, 1910.

Application filed February 25, 1909. Serial No. 480,015.

*To all whom it may concern:*

Be it known that I, WILLIAM B. BULL, a citizen of the United States, residing at Chicago, in the county of Cook and State of Illinois, have invented certain new and useful Improvements in Apparatus for Making Artificial Ice, of which the following is a specification, reference being had to the accompanying drawings.

My invention relates to the manufacture of artificial ice from raw water, and has for its object to provide certain improvements in the apparatus illustrated and described in the application of Omar H. Jewell, Serial No. 438,373, filed June 13, 1908, and his application of even date herewith, Serial No. 480,012. According to the method employed in said Jewell apparatus the operation of freezing the raw water is conducted by applying a freezing medium to water contained in the upper portion of a suitable receptacle, meanwhile maintaining in the lower portion of said receptacle a zone of unfrozen water and causing the water in the receptacle to circulate so that the air bubbles and the impurities separated from the water by the operation of freezing do not adhere to the ice but are separated therefrom and the impurities ultimately are collected in the unfrozen zone of water at the bottom of the receptacle. The circulation referred to is best secured by introducing air under pressure into the receptacle through the non-freezing zone of water, the air rising through the water and thereby causing it to circulate. In the use of this method, as the formation of ice progresses, there comes a time when the vertical channel through the forming ice is closed by the coming together of the inner faces of the mass of ice. When this occurs the water above and below the closure is prevented from circulating, and if freezing is continued thereafter such impurities as it may contain above and below the closure are frozen into the mass. Moreover, as is well known, water expands in freezing, so that if at the commencement of the freezing operation the can is filled to the level of the upper margin of the freezing zone, as freezing progresses the water gradually rises in the can, thus increasing the proportion of water that is retained in the can above the closure made when the opposite masses of ice come together. Furthermore, by thus increasing the depth of water in the can, the pressure which must be overcome by the compressed air in entering the can at the bottom is increased, and consequently unless the pressure of the air is correspondingly increased, the admission of air is correspondingly reduced, if not stopped altogether, thus stopping the circulation of the water. This is particularly objectionable where it is desired to make the freezing operation automatic, and make it unnecessary to employ a watcher to take care of the apparatus during the freezing operation. Furthermore, it is highly desirable that means be provided for automatically removing from the receptacle the impure water which accumulates in the non-freezing zone, and not only prevent it from contaminating the ice, but also from freezing up in the receptacle as might be the case if it were not removed promptly upon the cessation of circulation, as might be the case if the apparatus were left unwatched for a long time.

The objects of my present invention are to maintain a constant level of water in the freezing receptacle, and thereby not only prevent the retention of an undue quantity of water therein after the closure of the passage through the receptacle, as above described, but also to maintain the pressure upon the air inlet substantially constant; also to insure the automatic removal of all, or substantially all, the impure water from the can as soon as the circulation ceases, thus preserving the ice in a pure condition and automatically stopping the freezing operation when the closure of the passage through the receptacle is accomplished, or soon thereafter. I accomplish these objects as illustrated in the drawings and as hereinafter described.

What I regard as new is set forth in the claims.

In the accompanying drawings,—Figure 1 is a vertical sectional view, showing my improved apparatus; Fig. 2 is an end view thereof; and Fig. 3 is a section on line 3—3 of Figs. 1 and 2.

Referring to the drawings,—4 indicates the can, or other receptacle, which contains the water to be treated.

5 indicates a jacket, which surrounds the tank 4 intermediately, there being a portion 6 at the top and a portion 7 at the bottom beyond said jacket, as shown in Fig. 1. The jacket 5 forms a chamber 8 adapted to contain ammonia, or other freezing agent, thereby subjecting the water in the upper portion of the receptacle 4 to a freezing temperature.

9—10 indicate pipes, through which a circulation of the ammonia through the chamber 8 is effected.

11 indicates the non-freezing zone at the bottom of the tank 4.

12 indicates a pipe, which communicates with the bottom of the non-freezing zone and is preferably provided with a cock 13 through which the water may be drawn off.

14 indicates an equalizing-pipe, which rises from the pipe 12 and is provided at its upper end with a nozzle 15 which projects over a trough 16, or other receptacle. It will be noted that the upper level of the pipe 14 is coincident with that of the top of the freezing zone of the tank 4. Obviously, the pipe 14 controls the level of the water in the tank 4 and consequently of the top of the ice block.

17 indicates an air-pipe, which opens into the bottom of the non-freezing zone, as shown in Fig. 1.

18 indicates an air-pump, or other device, for supplying compressed air to the pipe 17.

The receptacle or can being filled with water, the level of the water obviously cannot rise higher than the point of discharge of the equalizing-pipe 14. As the freezing progresses the water in turning to ice expands and this would, without the equalizing-pipe, result in the formation of a cake of ice longer by some inches than the original depth of the water to be frozen. But, as stated, when the freezing process begins and the water begins to expand the increased volume of water in the can is taken care of by the equalizing-pipe which immediately begins to drip or run in a more or less rapid stream, corresponding precisely to the rapidity of the freezing process. The water level in the can—that is to say, the ice level ultimately—is thus maintained as it originally was throughout the entire process of freezing. An important benefit resulting from this is that the head of water upon the air pressure is maintained absolutely constant, so that the air feed being established at the beginning of the process of freezing requires no attention or alteration throughout the process. A more important function, however, of the equalizing-pipe is as follows: When the freezing has progressed to such a point that there is no longer any open passage for the escape upward through the ice cake of the air feed, the air pressure being constant, at once begins to expel through the equalizing-pipe all of the unfrozen water at the bottom of the can and in the unfrozen zone which lies above the outlet from the zone to the equalizing-pipe. This makes the freezing process so automatic that it requires no attention upon the part of the operator until such time as meets his convenience as there is no longer any unfrozen water in the bottom of the can, or in the zone, to be frozen into the cake of ice marring its appearance or interfering with the absolute purity which has thus far been maintained.

My improved apparatus dispenses with every form of working part, such as valves or the like, which might become clogged or frozen or otherwise inoperative, and the water thus removed from the water to be frozen is thrown away outside of the apparatus and does not remain where it is liable to be frozen up and thus the source of much annoyance.

That which I claim as my invention, and desire to secure by Letters Patent, is,—

1. An apparatus for making ice, comprising a receptacle adapted to contain the water to be frozen, means for applying a freezing medium to the upper portion only of said receptacle thereby leaving a zone of unfrozen water in the lower portion thereof, and means for maintaining the level of the water in said receptacle substantially constant as freezing progresses.

2. An apparatus for making ice, comprising a receptacle adapted to contain the water to be frozen, means for applying a freezing medium to the upper portion only of said receptacle thereby leaving a zone of unfrozen water in the lower portion thereof, and an overflow pipe connected with said non-freezing zone and having an outlet substantially at the normal level of the water in said receptacle.

3. An apparatus for making ice, comprising a receptacle adapted to contain the water to be frozen, means for applying a freezing medium to the upper portion only of said receptacle thereby leaving a zone of unfrozen water in the lower portion thereof, means for maintaining the level of the water in said receptacle substantially constant as freezing progresses, and means for causing the water in said receptacle to circulate as freezing progresses.

4. An apparatus for making ice, comprising a receptacle adapted to contain the water to be frozen, means for applying a freezing medium to the upper portion only of said receptacle thereby leaving a zone of unfrozen water in the lower portion thereof, an overflow pipe connected with said non-freezing zone and having an outlet substantially at the normal level of the water in said receptacle, and means for causing the water in said receptacle to circulate as freezing progresses.

5. An apparatus for making ice, comprising a receptacle adapted to contain the water to be frozen, means for applying a freezing medium to the upper portion only of said receptacle thereby leaving a zone of unfrozen water in the lower portion thereof, means for maintaining the level of the water in said receptacle substantially constant as freezing progresses, and means for introducing compressed air into the water to be frozen through said non-freezing zone.

6. An apparatus for making ice, comprising a receptacle adapted to contain the water to be frozen, means for applying a freezing medium to the upper portion only of said receptacle thereby leaving a zone of unfrozen water in the lower portion thereof, an overflow pipe connected with said non-freezing zone and having an outlet substantially at the normal level of the water in said receptacle, and means for introducing compressed air into the water to be frozen through said non-freezing zone.

7. An apparatus for making ice, comprising a receptacle adapted to contain the water to be frozen, means for applying a freezing medium to the upper portion only of said receptacle, the lower portion thereof being exposed to the air forming a non-freezing zone, means for introducing compressed air into the water through said non-freezing zone, and means for maintaining substantially constant the level of the water in said receptacle.

8. An apparatus for making ice, comprising a receptacle adapted to contain the water to be frozen, means for applying a freezing medium to the upper portion only of said receptacle, the lower portion thereof being exposed to the air forming a non-freezing zone, means for introducing compressed air into the water through said non-freezing zone, and an equalizing pipe connected with said non-freezing zone and having a discharge opening at substantially the normal level of the water in said receptacle.

9. An apparatus for making ice, comprising a receptacle adapted to contain the water to be frozen, means for applying a freezing medium to the water in the upper portion only of said receptacle, and means for maintaining the level of the water in said receptacle substantially constant as freezing progresses.

10. An apparatus for making ice, comprising a receptacle adapted to contain the water to be frozen, means for applying a freezing medium to the water in the upper portion only of said receptacle, means for maintaining the level of the water in said receptacle substantially constant as freezing progresses, and means for causing the water in said receptacle to circulate as freezing progresses.

11. An apparatus for making ice, comprising a receptacle adapted to contain the water to be frozen, means for applying a freezing medium to said receptacle, and an equalizing pipe connected with the lower portion of said receptacle and having a discharge opening at substantially the normal level of the water therein.

WILLIAM B. BULL.

Witnesses:
   JOHN L. JACKSON,
   MINNIE A. HUNTER.